United States Patent [19]

Erving

[11] Patent Number: 4,887,288
[45] Date of Patent: Dec. 12, 1989

[54] SELF CALIBRATION ARRANGEMENT FOR A VOICE SWITCHED SPEAKERPHONE

[75] Inventor: Richard H. Erving, Red Bank, N.J.

[73] Assignees: American Telephone and Telegraph Company, New York, N.Y.; AT&T Information.Systems Inc., Morristown, N.J.

[21] Appl. No.: 290,772

[22] Filed: Dec. 28, 1988

[51] Int. Cl.⁴ .................................................. H04M 9/10
[52] U.S. Cl. .......................................... 379/6; 379/389; 379/390
[58] Field of Search ............................ 379/389, 390, 6

[56] References Cited

U.S. PATENT DOCUMENTS 4,608,462  8/1986  Blomley et al. ...................... 379/390

Primary Examiner—Stafford D. Schreyer
Attorney, Agent, or Firm—Samuel R. Williamson

[57] ABSTRACT

An electrical calibration circuit in a voice switched adaptive speakerphone accurately determines the operating parameters of the speakerphone for optimal performance before operation. This is achieved by updating thresholds used to determine when the speakerphone should be in each of three possible operating states; transmit, receive or idle. During operation, these thresholds are compared with transmit and receive signal strength levels to determine the state of the speakerphone. The thresholds are updated to counteract the effects of variation and aging of hardware circuits in the speakerphone and are obtained by having the calibration circuit generate a test tone signal which is passed through speech processing circuitry in the speakerphone at two different levels and the resulting response measured. Since the calibration circuit has available the initial levels of the test tone signal that is passed through the speech processing circuitry and measures the relative levels of the signal that returns, the calibration circuit can adjust the speakerphone thresholds before operating to account for any variation in the circuitry. This test tone signal is passed through both a transmit speech path and a receive speech path in the speakerphone circuitry to separately adjust for variations in each speech path. In this manner, essentially equal thresholds are commonly set up for each path, even though the values of corresponding circuit components in the paths may differ considerably.

8 Claims, 13 Drawing Sheets

SELF CALIBRATION ARRANGEMENT FOR A VOICE SWITCHED SPEAKERPHONE

BACKGROUND OF THE INVENTION

1. Technical Field

This invention relates to audio systems and, more particularly, to voice switching circuits which connect to an audio line for providing two-way voice switched communications.

2. Description of the Prior Art

The use of analog speakerphones have been the primary hands free means of communicating during a telephone conversation for a great number of years. This convenient service has been obtained at the price of some limitations, however. These speakerphone usually require careful and expensive calibration in order to operate in an acceptable manner. They are also designed to operate in a worst-case electrical environment thereby sacrificing the improved performance that is possible in a better environment.

The operation of conventional analog speakerphones is well known and is described in an article by A. Busala, "Fundamental Considerations in the Design of a Voice-Switched Speakerphone," Bell System Technical Journal, Vol. 39, No. 2, March 1960, pp 265-294. Analog speakerphones generally use a switched-loss technique through which the energy of the voice signals in both a transmit and a receive direction are sensed and a switching decision made based upon that information. The voice signal having the highest energy level in a first direction will be given a clear talking path and the voice signal in the opposite direction will be attenuated by having loss switched into its talking path. If voice signals are not present in either the transmit direction or the receive direction, the speakerphone goes to an "at rest" mode which provides the clear talking path to voice signals in a receive direction favoring speech from a distance speaker. In some modern analog speakerphones, if voice signals are not present in either the transmit direction or the receive direction, the speakerphone goes to an idle mode where the loss in each direction is set to a mid-range level to allow the direction wherein voice signals first appear to quickly obtain the clear talking path.

Most high-end analog speakerphones also have a noise-guard circuit to adjust the switching levels according to the level of background noise present. Switching speed is limited by a worst-case time constant that assures that any speech energy in the room has time to dissipate. This limitation is necessary to prevent "self switching", a condition where room echoes are falsely detected as near-end speech.

A disadvantage associated with analog speakerphones is that they are difficult to calibrate, or require precision voltage references to assure consistent operation. In some designs, the newly manufactured analog speakerphone performs well, but over the course of a few years, its performance degrades to the point where it becomes unusable. In one known example, a critical calibration value relied on the stability of two different power supplies in the speakerphone. Over a period of time, one or the other of the supplies tended to drift enough to significantly change the speakerphone's performance.

In order to provide appropriate switching in an analog speakerphone, transmit and receive signal strengths are measured to provide a logic switching unit in the speakerphone with information as to what the current state of the speakerphone should be. This logic unit usually consists of circuitry that compares the current audio levels against calibrated thresholds provided by the voltage references. The result of this comparison determines the state of the speakerphone. Thus, these thresholds must be precisely controlled in order to keep speakerphone performance optimal.

SUMMARY OF THE INVENTION

An adaptive speakerphone accurately determines its operating state without the above disadvantages and limitations through use of a self calibration arrangement. The adaptive speakerphone includes circuitry which measures the energy of the transmit and receive signals and also develops information about the signal and noise levels for efficient operation. This information is obtained for the calibration arrangement, which illustratively includes a computer in the speakerphone, for determining when the speakerphone should be in each of three possible operating states, i.e., transmit, receive or idle, in accordance with the invention. The computer calibrates the speakerphone's operating parameters before operating by updating thresholds used to determine its state. Theses thresholds are updated to counteract the effects of variation and aging of hardware circuits and are obtained by passing a computer-generated test tone signal through the speakerphone circuitry at two different levels and measuring the resulting response.

In an illustrative embodiment of the invention, one level of the test tone signal is referenced at zero dB and the other level referenced at minus 20 dB. The difference between the two responses is used by the computer as a basic constant of proportionality that represents "20 dB" of difference in the speech processing circuitry. This measurement is performed on both a transmit path and a receive path in the speech processing circuitry thus obtaining a number representative of a constant of proportionality for each path. The number measured for the receive path may be different from the number measured by the transmit path due to hardware component variations. The computer simply stores the respective number for the appropriate path with an assigned value of minus 20 dB to each number. Once the computer has determined the number representing minus 20 dB for each path, it is then able to set other required dB threshold levels for each path that are proportionally scaled to that path's number. Also, because of the relative scaling, the common thresholds tht are set up in each path always will be essentially equal even though the values of corresponding circuit components in the paths may differ considerably. When manufactured, the speakerphone similarly requires no calibration at the factory. Rather, the computer simply performs a calibration measurement and, if successful, the speakerphone is deemed ready for operation.

DETAILED DESCRIPTION

Figure 1:
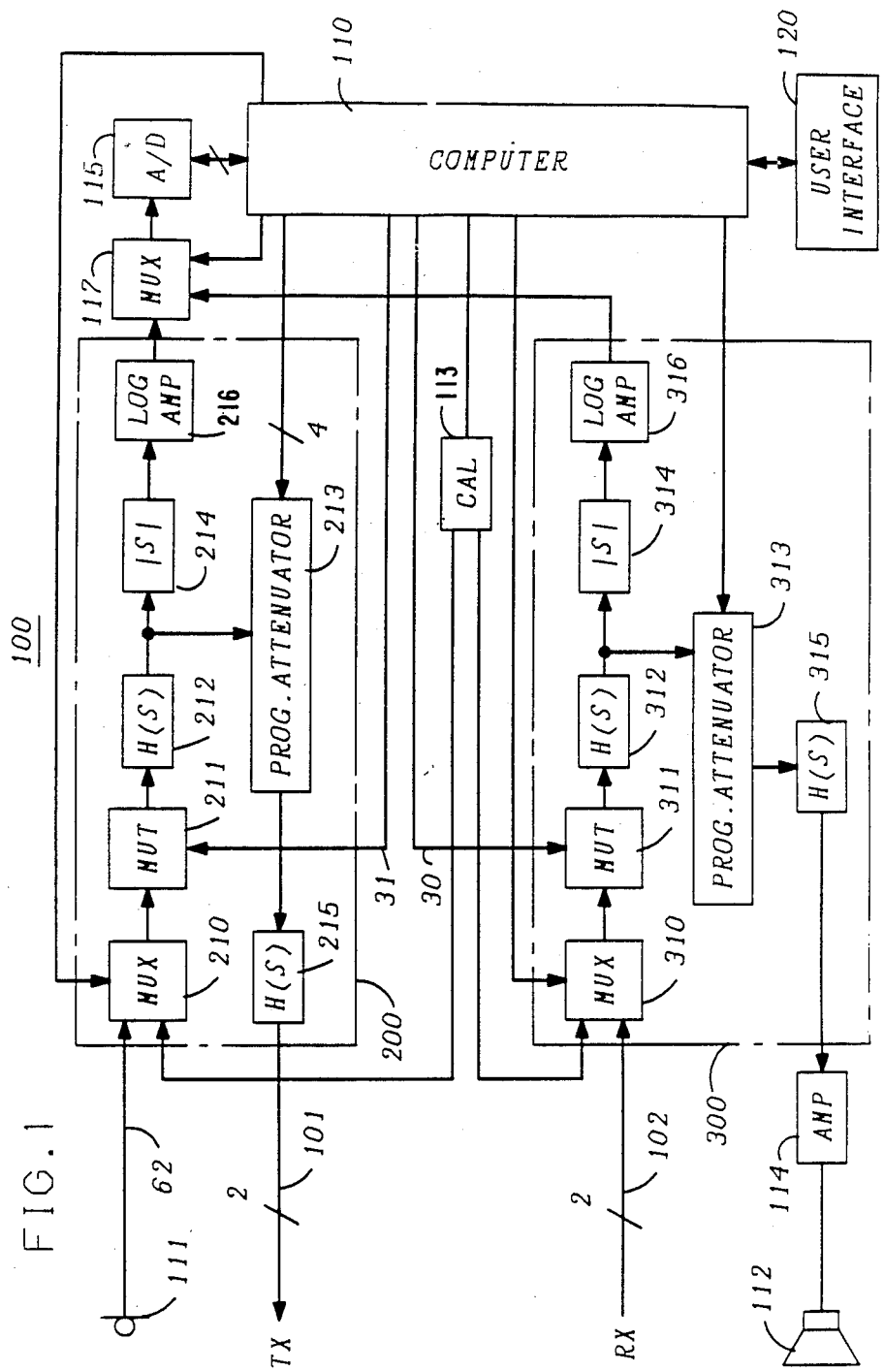
FIG. 1 is a block representation of the major functional components of a computer controlled adaptive speakerphone operative in accordance with the principles of the invention.

FIG. 1 is a functional block representation of a computer controlled adaptive speakerphone 100 operative in accordance with the principles of the invention. As shown, the speakerphone generally comprises a transmit section 200, a receive section 300, and a computer 110. A microcomputer commercially available from Intel Corporation as Part No. 8051 may be used for computer 110 with the proper programming. A microphone 111 couples audio signals to the speakerphone and a speaker 112 receives output audio signals from the speakerphone.

By way of operation through illustration, an audio signal provided by a person speaking into the microphone 111 is coupled into the transmit section 200 to a multiplexer 210. In addition to being able to select the microphone speech signal as an input, the multiplexer 210 may also select calibration tones as its input. These calibration tones are provided by a calibration circuit 113 and are used, in this instance, for calibration of the hardware circuitry in the transmit section 200.

Connected to the multiplexer 210 is a mute control 211 which mutes the transmit path in response to a control signal from the computer 110. A high pass filter 212 connects to the mute control 211 to remove the room and low frequency background noise in the speech signal. The output of the high pass filter 212 is coupled both to a programmable attenuator 213 and to an envelope detector 214. In response to a control signal from the computer 110, the programmable attenuator 213 inserts loss in the speech signal in three and one half dB steps up to a total of sixteen steps, providing 56 dB of total loss. This signal from the programmable attenuator 213 is coupled to a low pass filter 215 which removes any spikes that might have been generated by the switching occurring in the attenuator 213. This filter also provides additional signal shaping to the signal before the signal is transmitted by the speakerphone over audio line 101 to a hybrid (not shown). After passing through the envelope detector 214, the speech signal from the filter 212 is coupled to a logarithmic amplifier 216, which expands the dynamic range of the speakerphone to approximately 60 dB for following the envelope of the speech signal.

The receive section 300 contains speech processing circuitry that is functionally the same as that found in the transmit section 200. A speech signal received over an input audio line 102 from the hybrid is coupled into the receive section 300 to the multiplexer 310. Like the multiplexer 210, the multiplexer 310 may also select calibration tones for its input, which are provided by the calibration circuit 113. Connected to the multiplexer 310 is a mute control 311 which mutes the receive path in response to a control signal from the computer 110. A high pass filter 312 is connected to the mute control 311 to remove the low frequency background noise from the speech signal.

The output of the high pass filter 312 is coupled both to an envelope detector 314 and to a programmable attenuator 313. The envelope detector 314 obtains the signal envelope for the speech signal which is then coupled to a logarithmic amplifier 316. This amplifier expands the dynamic range of the speakerphone to approximately 60 dB for following the envelope of the receive speech signal. The programmable attenuator 313, responsive to a control signal from the computer 110, inserts loss in the speech signal in three and one half dB steps in sixteen steps, for 56 dB of loss. This signal from the programmable attenuator 313 is coupled to a low pass filter 315 which removes any spikes that might have been generated by the switching occurring in the attenuator 313. This filter also provides additional signal shaping to the signal before the signal is coupled to the loudspeaker 112 via an amplifier 114.

The signals from both the logarithmic amplifier 216 and the logarithmic amplifier 316 are multiplexed into an eight-bit analog-to-digital converter 115 by a multiplexer 117. The converter 115 presents the computer 110 with digital information about the signal levels every 750 microseconds.

The computer 110 measures the energy of the incoming signals and develops information about the signal and noise levels. Both a transmit signal average and a receive signal average are developed by averaging samples of each signal according to the following equation:

$$\hat{y}_t = \begin{cases} \hat{y}_{t-1} + \dfrac{|s|_t - \hat{y}_{t-1}}{4} & \text{if } |s|_t \geq \hat{y}_{t-1} \\ \hat{y}_{t-1} + \dfrac{|s|_t - \hat{y}_{t-1}}{32} & \text{if } |s|_t < \hat{y}_{t-1} \end{cases}$$

where
Sampling rate = 1333 per second
$|s|_t$ = new sample $\hat{y}_{t-1}$ = old average
$\hat{y}_t$ = new average This averaging technique tends to pick out peaks in the signal applied. Since speech tends to have many peaks rather than a constant level, this average favors detecting speech.

Both a transmit noise average and a receive noise average are also developed. The transmit noise average determines the noise level of the operating environment of the speakerphone. The receive noise average measures the noise level on the line from the far-end party. The transmit noise average and the receive noise average are both developed by measuring the lowest level seen by the converter 115. Since background noise is generally constant, the lowest samples provide a reasonable estimate of the noise level. The transmit and receive noise averages are developed using the following equation:

$$\hat{y}_t = \begin{cases} \hat{y}_{t-1} + \dfrac{|s|_t - \hat{y}_{t-1}}{4096} & \text{if } |s|_t \geq \hat{y}_{t-1} \\ \hat{y}_{t-1} + \dfrac{|s|_t - \hat{y}_{t-1}}{4} & \text{if } |s|_t < \hat{y}_{t-1} \end{cases}$$

where
Sampling rate = 1333 per second
$|s|_t$ = new sample
$\hat{y}_{t-1}$ = old average
$\hat{y}_t$ = new average This equation strongly favors minimum values of the envelope of the applied signal, yet still provides a path for the resulting average to rise when faced with a noisier environment.

Two other signal levels are developed to keep track of the loop gain, which affects the switching response and singing margin of the speakerphone. These signal levels are the speech level that is present after being attenuated by the transmit attenuator 213 and the speech level that is present after being attenuated by the receive attenuator 313. In the speakerphone, these two levels are inherently known due to the fact that the computer 110 directly controls the loss in the attenuators 213 and 313 in discrete amounts, 3.5 dB steps with a maximum loss of 56 dB in each attenuator. All of these levels are developed to provide the computer 110 with accurate and updated information about what the current state of the speakerphone should be.

As in all speakerphones, the adaptive speakerphone needs to use thresholds to determine its state. Unlike its analog predecessors, however, those thresholds need not be constant. The computer 110 has the ability to recalibrate itself to counteract variation and aging of hardward circuitry in the speakerphone. This is achieved by passing a first and a second computer-generated test tone through the transmit path and the receive path of the hardware circuitry and measuring both responses.

These test tones are generated at a zero dB level and a minus 20 dB level. The difference measured between the zero dB level tone and the minus 20 dB level tone that passes through the speakerphone circuitry is used as a base line for setting up the thresholds in the speakerphone. First, by way of example, the zero dB level tone is applied to the transmit path via multiplexer 210 and that response measured by the computer 110. Then the minus 20 dB tone is similarly applied to the transmit path via multiplexer 210 and its response measured by the computer. The difference between the two responses is used by the computer as a basic constant of proportionality that represents "20 dB" of difference in the transmit path circuitry. This same measurement is similarly performed on the receive path circuitry by applying the two test tones via multiplexer 310 to the receive path. Thus, a constant of proportionality is also obtained for this path. The number measured for the receive path may be different from the number measured by the transmit path due to hardware component variations. The computer simply stores the respective number for the appropriate path with an assigned value of minus 20 dB to each number. Once the computer has determined the number representing minus 20 dB for each path, it is then able to set the required dB threshold levels in each path that are proportionally scaled to that path's number. Also, because of the relative scaling, the common thresholds that are set up in each path always will be essentially equal even though the values of corresponding circuit commponents in the paths may differ considerably.

As part of the calibration process, the speakerphone also measures the acoustics of the room in which it operates. Through use of the calibration circuit 113, the speakerphone generates a series of eight millisecond tone bursts throughout the audible frequency of interest and uses these in determining the time-domain acoustic response of the room. each tone burst is sent from the calibration circuit 113 through the receive section 300 and out the loudspeaker 112. The integrated response, which is reflective of the echoes in the room from each tone burst, is picked up by the microphone 111 and coupled via the transmit section 200 to the computer 110 where it is stored as a composite response pattern, shown in FIG. 11 and described in greater detail later herein. This response is characterized by two important factors: the maximum amplitude of the returned signal, and the duration of the echoes. The amplitude of the returned signal determines what level of transmit speech will be required to break in on receive speech. The greater the acoustic return, the higher that threshold must be to protect against self-switching. The duration of the echoes determine how quickly speech energy injected into the room will dissipate, which controls how fast the speakerphone can switch from a receive to a transmit state. If the room acoustics are harsh, therefore, the speakerphone adapts by keeping switching response on a par with that of a typical analog device. But when acoustics are favorable, it speeds up the switching time and lowers break in thresholds to provide a noticeable improvement in performance.

The concept of self-calibration is also applied to the speakerphone's interface to a hybrid. During a conversation, the computer measures the degree of hybrid reflection that it sees. This hybrid reflection provides a measure of both the hybrid and far-end acoustic return. Its average value is determined using the following equation:

$$H_t = \begin{cases} H_{t-1} + \dfrac{(R_t - T_t) - H_{t-1}}{4096} & \text{if } (R_t - T_t) \geq H_{t-1} \\ H_{t-1} + \dfrac{(R_t - T_t) - H_{t-1}}{4} & \text{if } (R_t - T_t) < H_{t-1} \end{cases}$$

where
Sampling rate=1333 per second
$R_t$=receive signal average
$T_t$=transmit signal average
$H_{t-1}$=old hybrid average
$H_t$=new hybrid average This equation develops the hybrid average value by subtracting a transmit signal from a receive signal and then averaging these signals in a manner that favors the maximum difference between them. The receive signal is that signal provided to the speakerphone by the hybrid on the receive line and the transmit signal is that signal provided to the hybrid by the speakerphone on the transmit line. By developing an estimate of the hybrid average, the amount of switched loss required in the speakerphone to maintain stability may be raised or lowered. By lowering the amount of switched loss, speakerphone switching operation becomes more transparent and can even approach full-duplex for fully digital connections.

The estimate of the hybrid average is also used to determine the switching threshold level of the speakerphone in switching from the transmit state to the receive state (receive break in). Since the estimate of the hybrid average is used to develop an expected level of receive speech due to reflection, additional receive speech due to the far-end talker may be accurately determined and the state of the speakerphone switched accordingly.

To obtain an accurate representation of the line conditions, hybrid averaging is performed only while the speakerphone is in the transmit state. This insures that receive speech on the receive line during a quiet transmit interval cannot be mistaken for a high level of hybrid return. This averaging therefore prevents receive speech, that is not great enough to cause the speakerphone to go into the receive state, from distorting the estimated hybrid average.

Another boundary condition employed in developing this hybrid average is a limitation on the acceptable rate of change of transmit speech. If transmit speech ramps up quickly, then the possibility of sampling errors increases. To avoid this potential source of errors, the hybrid average is only developed during relatively flat intervals of transmit speech (the exact slope is implementation-dependent).

To ensure stable operation with an adaptive speakerphone in use at both the near-end and the far-end by both parties, the amount that the hybrid average may improve during any given transmit interval is also limited. In the adaptive speakerphone 100, for example, the hybrid average is allowed to improve no more than 5 dB during each transmit state. In order for the hybrid average to improve further, a transition to receive and then back to transmit must be made. This insures that the far-end speakerphone has also had an opportunity to go into the transmit state and has similarly adapted. Thus, each speakerphone is able to reduce its inserted loss down to a point of balance in a monotonic fashion. Limiting the amount of change in the hybrid average during a transmit interval also allows this speakerphone to to be operable with other adaptive speakerphones such as echo-canceling speakerphones that present a varying amount of far-end echo as they adapt.

For ease of operation and for configuring the speakerphone, a user interface 120 through which the user has control over speakerphone functions is provided internal to the speakerphone 100. This interface includes such speakerphone functions as ON/OFF, MUTE and VOLUME UP/DOWN. The user interface also includes a button or other signaling device for initiating the recalibration process. Should the user relocate his or her speakerphone, pressing this button will perform an acoustic calibration to the new environment. In addition, the recalibration process checks the operational readiness of and recalibrates the internal hardware circuitry, and resets the volume level of the speakerphone to the nominal position.

Figure 2:
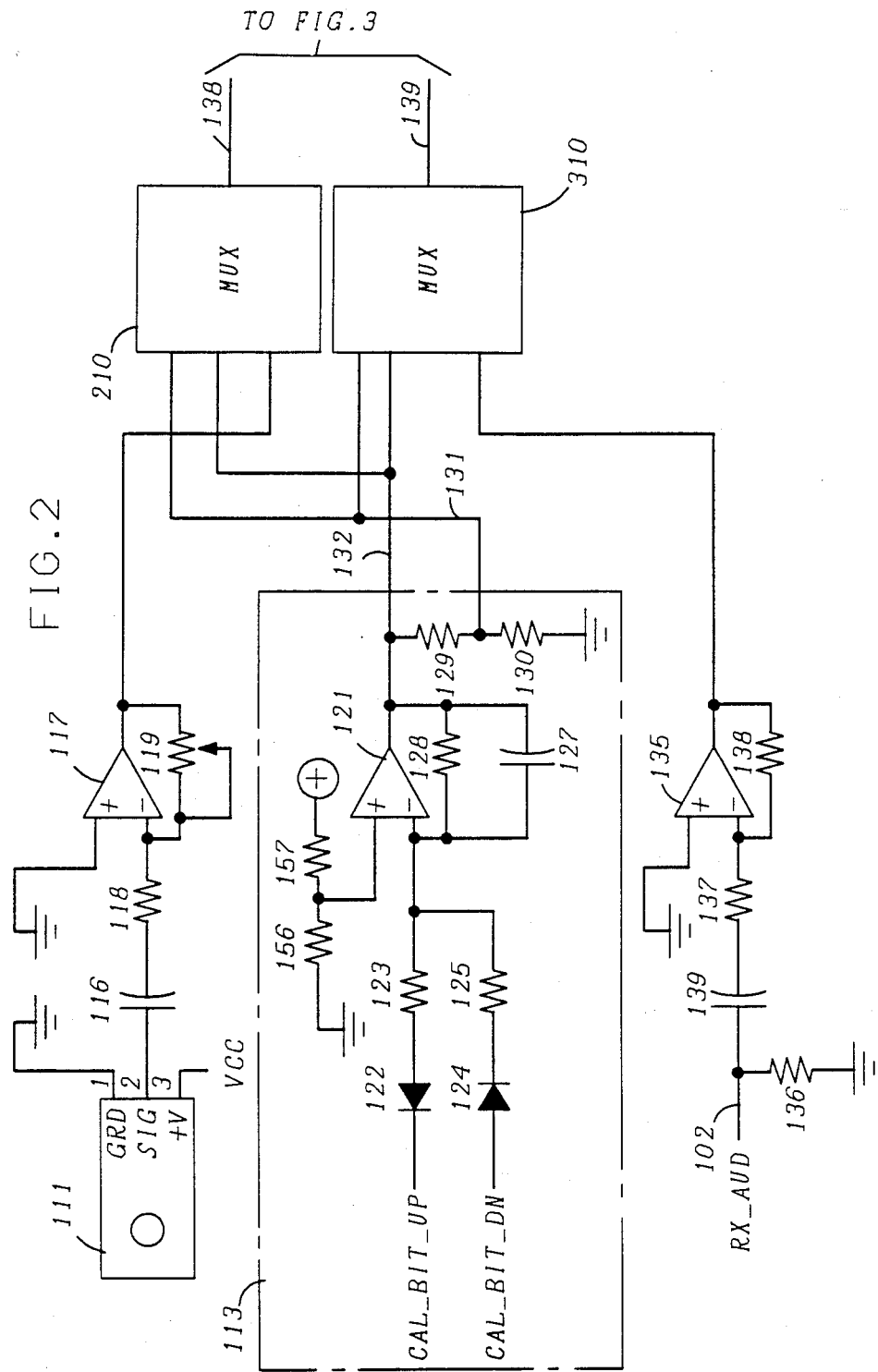
FIG. 2 is a partial schematic of the speakerphone including a calibration circuit, an amplifier for remotely provided speech signals, a microphone and an associated amplifier and multiplexers employed in this invention.
Figure 3:
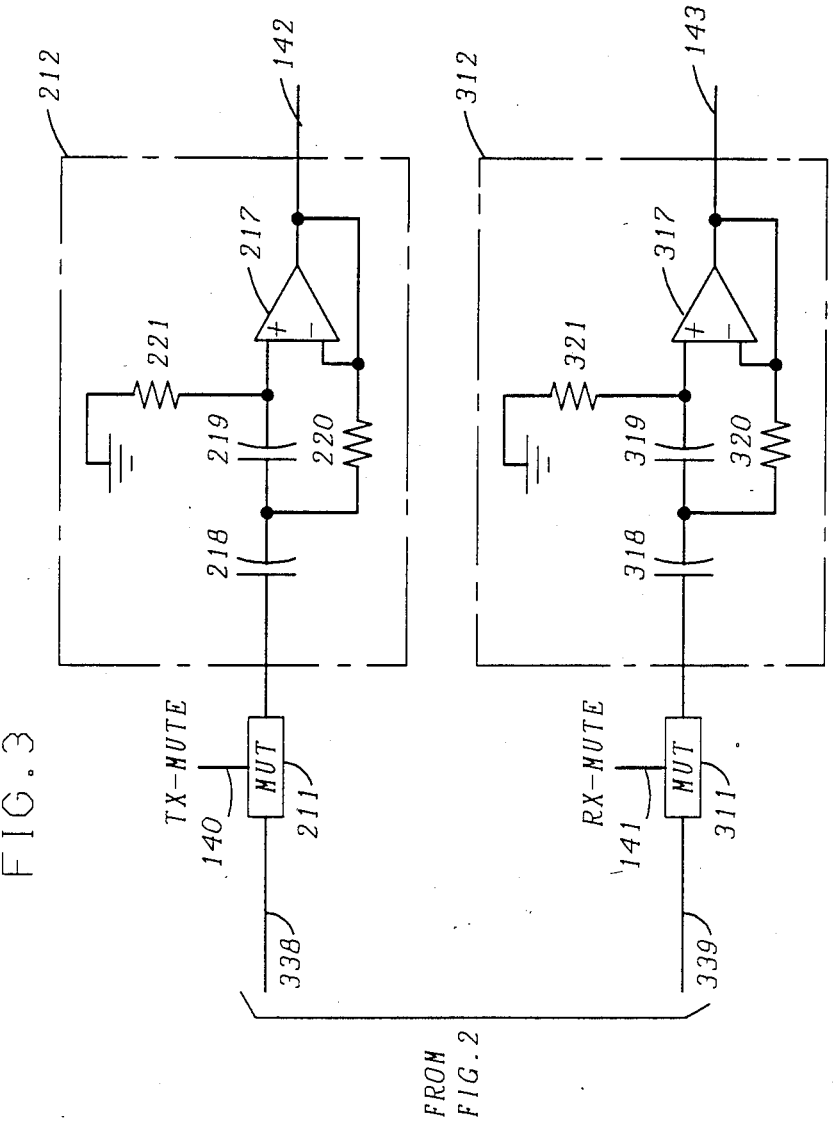
FIG. 3 is a partial schematic of the speakerphone including mute controls and high pass filters employed in this invention.

Referring now to FIGS. 2 and 3, there is shown a partial schematic of the speakerphone 100 including the multiplexers 210 and 310, mute controls 211 and 311, the calibration circuit 113, the microphone 111 and its associated amplifier 117, amplifier 135 for the remotely provided speech signals, and high pass filters 211 and 311.

Shown in greater detail is the microphone 111 which, in this circuit arrangement, is an electret microphone for greater sensitivity. This microphone is AC coupled via a capacitor 116 to an amplifier 117 which includes resistors 118 and 119 for setting the transmit signal gain from the microphone 111. From the amplifier 117, the speech signal is sent to the multiplexer 210 in the transmit section 200.

Also shown in greater detail is the calibration circuit 113 which receives a two-bit input from the computer 110 on lines designated as CALBIT UP and CALBIT DOWN. This two-bit input provides the tone burst signal used in the hardware circuitry and acoustic calibration processes. Three states from the two-bit input are defined and available: LOW reflects a zero level signal where the input signals on both CALBIT UP and CALBIT DOWN are one; HIGH reflects a condition where the input signals to both CALBIT UP and CALBIT DOWN are zero; and MIDDLE reflects a condition where, for example, the CALBIT UP signal is one and the CALBIT DOWN signal is zero. By alternately presenting and removing the respective input signals to both CALBIT UP and CALBIT DOWN in a desired sequence, a tone burst is generated which starts from ground level, goes up to some given positive voltage level, then down to some given negative voltage level, then returns back to ground level.

The CALBIT UP and CALBIT DOWN signals are respectively provided as input signals to an amplifier 121 via a first series connection, comprising diode 122 and resistor 123, and a second series conection, comprising diode 124 and resistor 125. The amplifier 121 and associated circuitry, capacitor 127 and resistor 128, are used to generate the desired output level reflective of the summation of the two input signals. A resistor divider, comprising resistors 156 and 157, provides an offset voltage to the non-inverting input of amplifier 121. Resistor divider, comprising resistors 129 and 130, provide the 20 dB reduction of the signal level from amplifier 121. This reduction is used for the comparison measurement when the speakerphone performs the electrical calibration process. Thus the signal on line 131 is 20 dB less than the signal on line 132. Both of these two signals are coupled to the multiplexers 210 and 310.

A receive audio input level conversion circuit, comprising amplifier 135, resistors 136, 137 and 138, and also capacitor 139, is connected to audio input line 102 for terminating this line in 600 ohms. This signal is coupled from the amplifier 135 to the multiplexer 310 along with the tone signal from amplifier 121 for further processing.

The output of the multiplexer 210 is provided over line 138 to a mute control 211 which mutes the transmit path in response to a control signal from the computer 110 over line 140. Similarly, the output of the multiplexer 310 is provided over line 139 to a mute control 311 which mutes the receive path in response to a control signal from the computer 110 over line 141. Respectively connected to the mute controls 211 and 311 are high pass filters 212 and 213. These high pass filters are essentially identical and are designed to remove the low frequency background noise in the speech signal. Filter 212 comprises a follower amplifier 217, and associated circuitry comprising capacitors 218 and 219, and resistors 220 and 221. The output of filter 212 is coupled over line 142 to the programmable attenuator 213 shown in FIG. 4. And filter 312 comprises a follower amplifier 317, and associated circuitry comprising capacitors 318 and 319, and resistors 320 and 321. The output of filter 312 is coupled over line 143 to the programmable attenuator 313 shown in FIG. 5.

Figure 4:
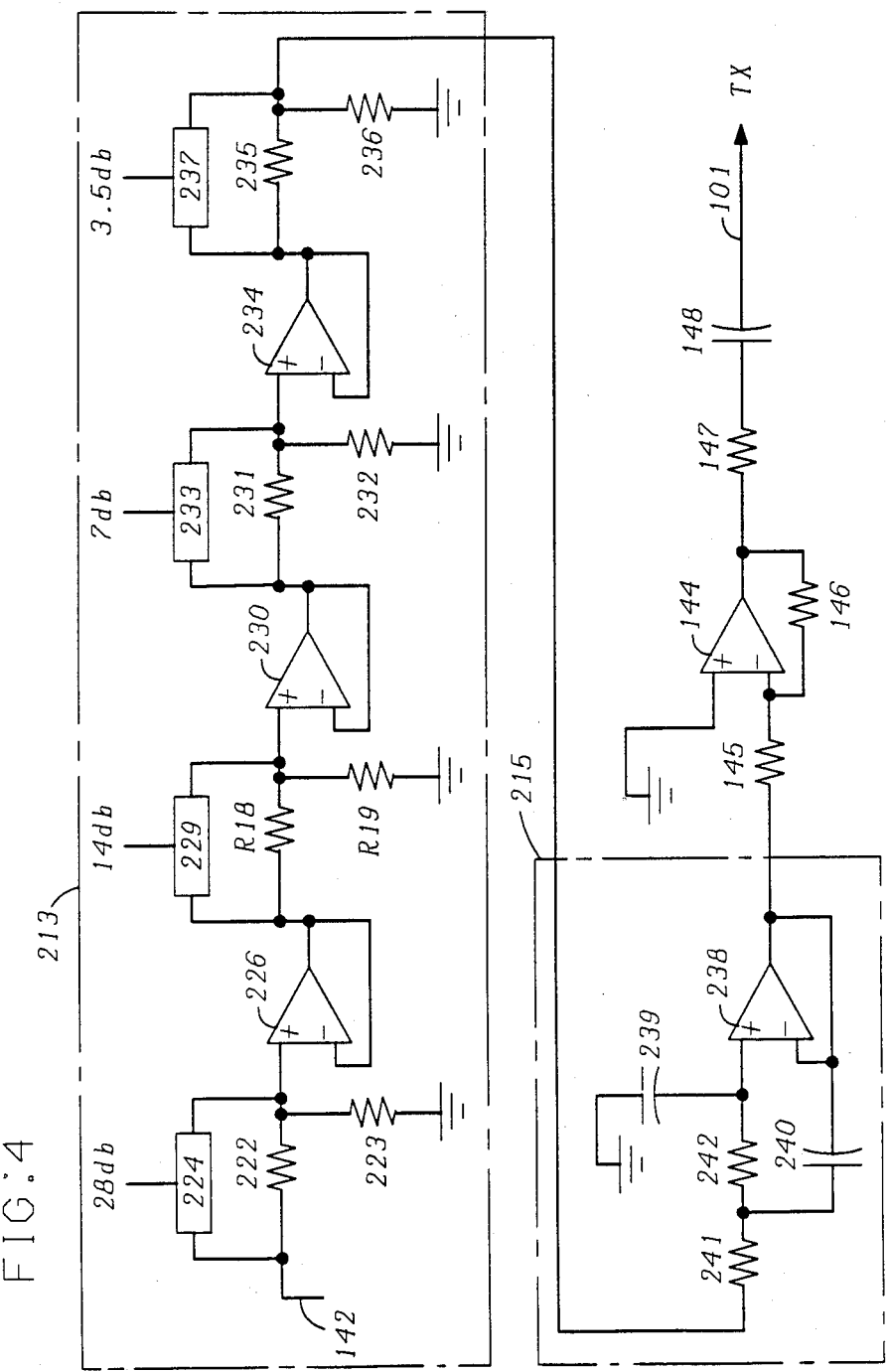
FIG. 4 is a schematic of a programmable attenuator and a low pass filter employed in a transmit section of this invention.

Referring now to FIG. 4, there is shown a detail schematic of the programmable attenuator 213. This attenuator comprises multiple sections which are formed by passing the output of an amplifier in one section through a switchable voltage divider and then into the input of another amplifier. The signal on line 142 from the high pass filter 212 is coupled directly to a first section of the attenuator 213 comprising a voltage divider consisting of resistors 222 and 223, a switch 224 and a follower amplifier 226. When the Switch 224 is closed shorting resistor 222, the voltage developed across the voltage divider essentially will be the original input voltage, all of which develops across resistor 223. Once the switch is opened, in response to a command from the computer 110, the signal developed at the juncture of resistors 222 and 223 is reduced from that of the original input voltage level to the desired lower level. The loss is inserted in each section of the attenuator in this manner.

Thus in operation, a speech signal passing through the first section of the attenuator is either passed at the original voltage level or attenuated by 28 dB. If the switch is turned on, i.e., the resistor 222 shorted out, then no loss is inserted. If the switch is turned off, then 28 dB of loss is inserted. The signal then goes through a second similar section which has 14 dB of loss. This second section of the attenuator 213 comprises a voltage divider consisting of resistors 227 and 228, a switch 229 and a follower amplifier 230. This second section is followed by a third section which has 7 dB of loss. This third section of the attenuator 213 comprises a voltage divider consisting of resistors 231 and 232, a switch 233 and a follower amplifier 234. A fourth and final section has 3½ dB of loss. This final section of the attenuator 213 comprises resistors 235 and 236 and a switch 237. By selecting the proper combination of on/off values for switches 224, 229, 233 and 237, the computer 110 may select from 0 to 56 dB of loss in 3½ dB increments. It should be understood that if a finer control of this attenuator is desired such that it could select attenuation in 1.75 dB increments, it is but a simple matter for one skilled in the art, in view of the above teachings, to add another section to the attenuator thereby providing this level of control.

This signal from the programmable attenuator 213 is coupled to the low pass filter 215 which provides additional shaping to the transmit signal. Low pass filter 215 comprises a follower amplifier 238, and associated circuitry comprising capacitors 239 and 240, and resistors 241 and 242. The output of filter 215 is coupled to a transmit audio output level conversion circuit, comprising amplifier 144, resistors 145, 146 and 147, and also capacitor 148, for connection to the audio output line 101. This output level conversion circuit provides an output impedance of 600 ohms for matching to the output line 101.

Figure 5:
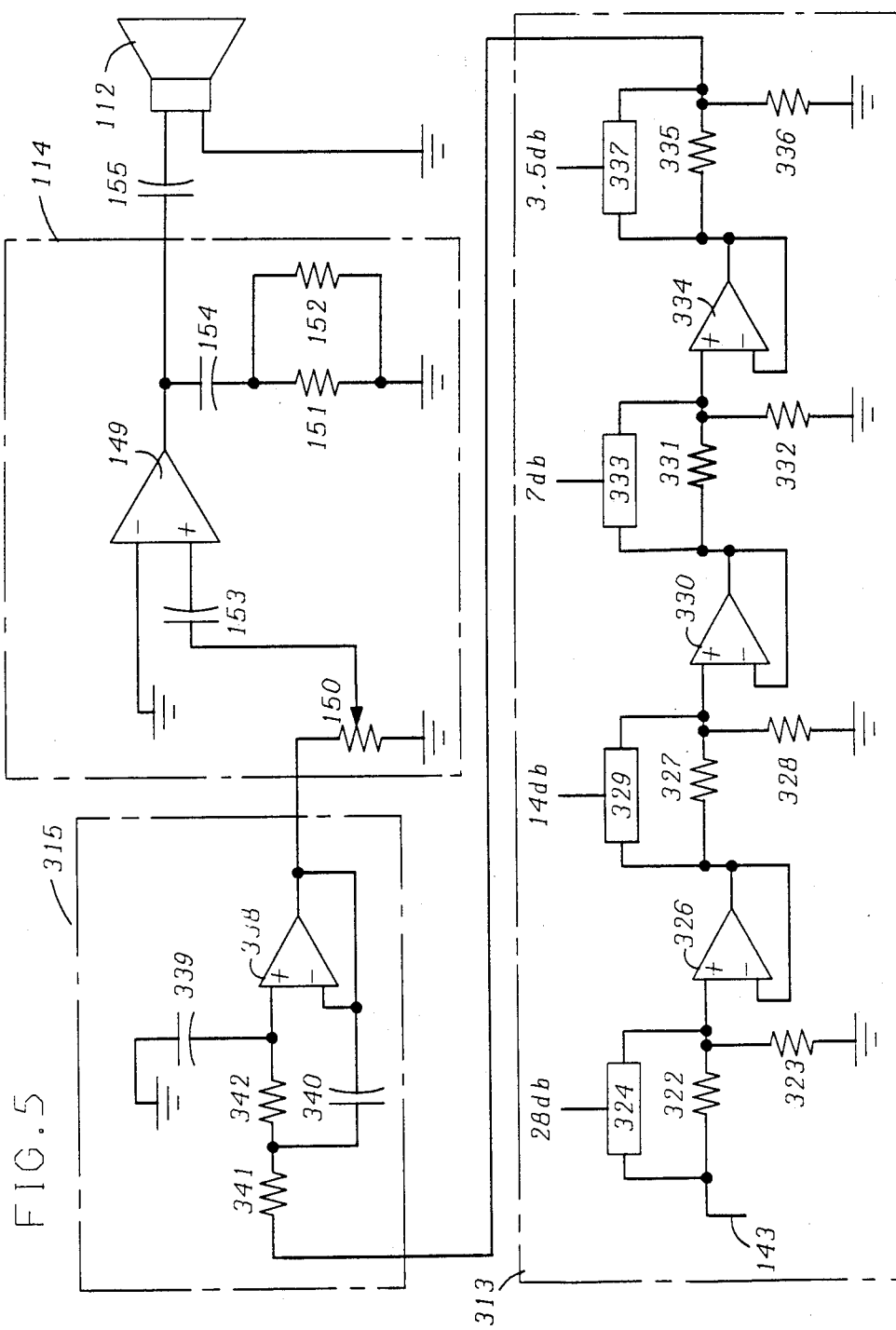
FIG. 5 is a schematic of a programmable attenuator and a low pass filter employed in a receive section of this invention.

Referring now to FIG. 5, there is shown a detail schematic for the programmable attenuator 313, the low pass filter 315 and the amplifier 114 for the loudspeaker 112. The same basic components are used in implementing the programmable attenuator 313 and the programmable attenuator 213. Because of this and the detailed description given to attenuator 213, this attenuator 313 will not be described in similar detail.

Follower amplifiers 326, 330 and 334 along with resistors 322, 323, 327, 328, 331, 332, 335 and 336, and also switches 324, 329, 333 and 337 combine in forming the four sections of the attenuator 313. As in attenuator 213, a speech signal is attenuated 28 dB by section one, 14 dB by section two and 7 dB and 3½ dB sections three and four respectively.

The signal from the programmable attenuator 313 is coupled to the low pass filter 315 which provides additional shaping to the receive signal. Low pass filter 315 comprises a follower amplifier 338, and associated circuitry including capacitors 339 and 340, and resistors 341 and 342. In amplifier 114, an amplifier unit 149 and associated circuitry, variable resistor 150, resistors 151 and 152, and capacitors 153 and 154, provide gain for the output signal from low pass filter 315 before coupling this signal to the speaker 112 via a capacitor 155.

Figure 6:
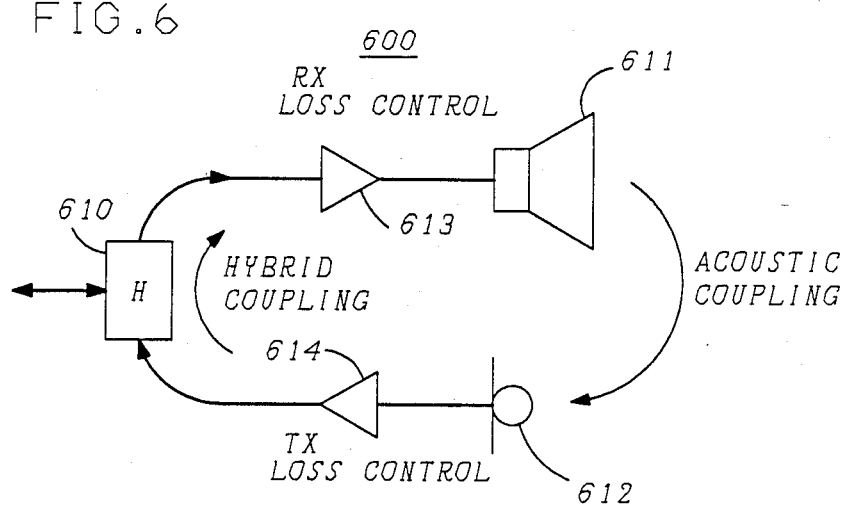
FIG. 6 depicts a general speakerphone circuit and two type of coupling that most affect its operation.

With reference to FIG. 6, there is shown a general speakerphone circuit 600 for describing the two type of coupling, hybrid and acoustic, that most affect the operation of a speakerphone being employed in a telephone connection. A hybrid 610 connects the transmit and receive paths of the speakerphone to a telephone line whose impedance may vary depending upon, for example, its length from a central office, as well as, for example, other hybrids in the connection. And the hybrid only provides a best case approximation to a perfect impedance match to this line. Thus a part of the signal on the transmit path to the hybrid returns over the receive path as hybrid coupling. With this limitation and the inevitable acoustic coupling between a loudspeaker 611 and a microphone 612, transmit and receive loss controls 613 and 614 are inserted in the appropriate paths to avoid degenerative feedback or singing.

Figure 7:
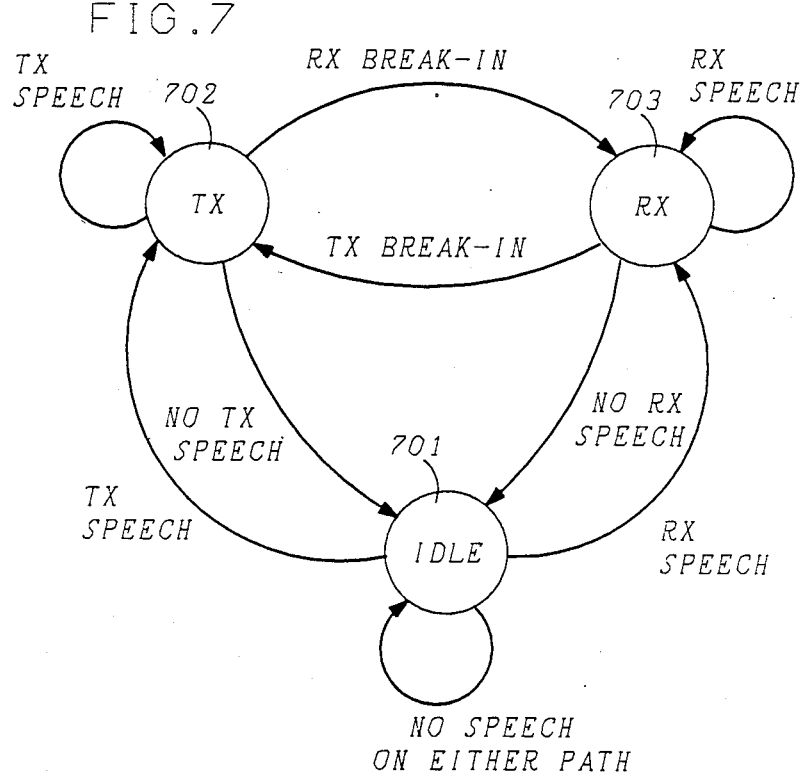
FIG. 7 is a state diagram depicting the three possible state of the speakerphone of FIG. 1.
Figure 8:
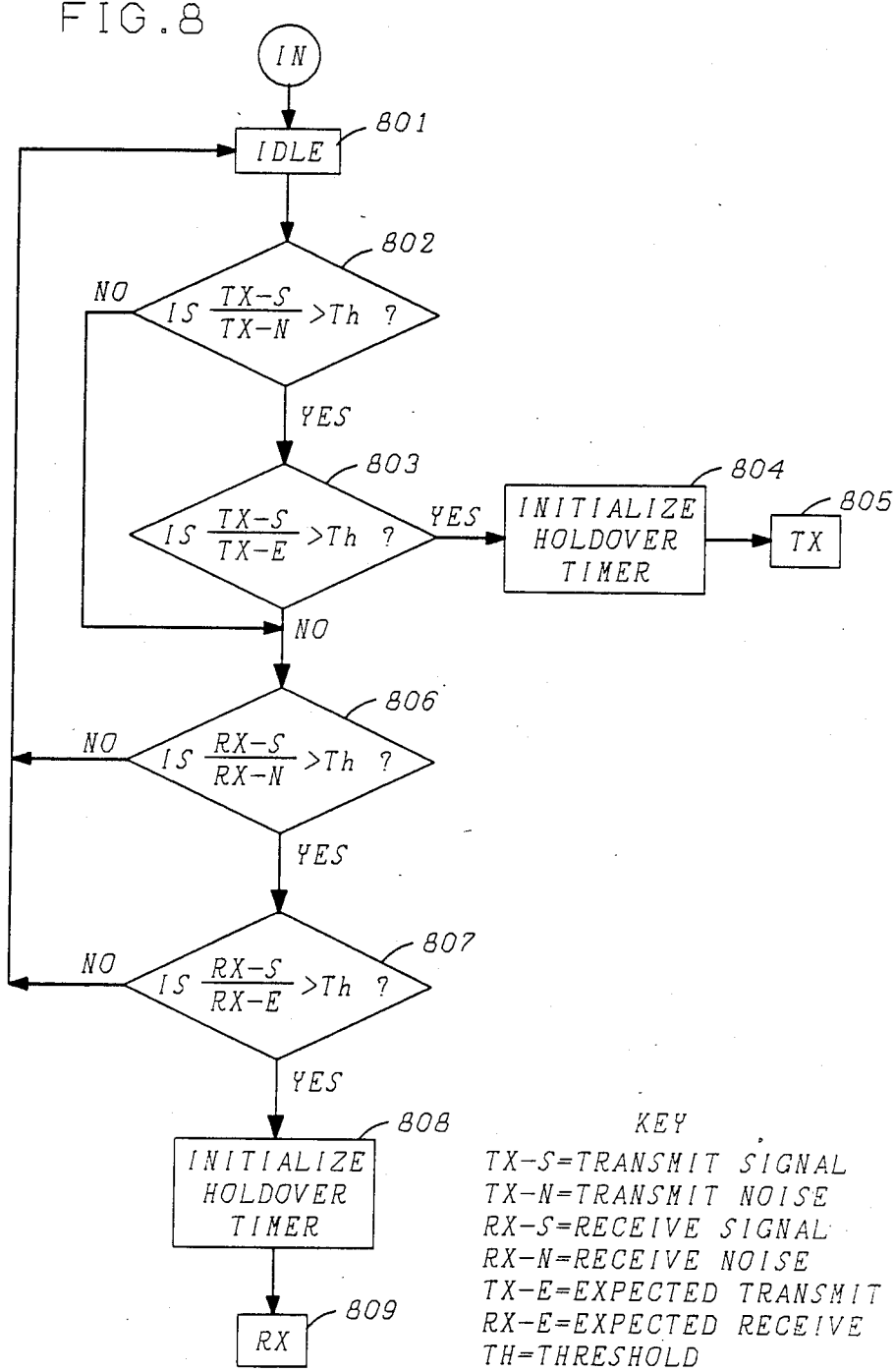
FIG. 8 depicts a flow chart illustrating the operation of the speakerphone of FIG. 1 in determining whether to remain in an idle state or move from the idle state to a transmit or a receive state.
Figure 9:
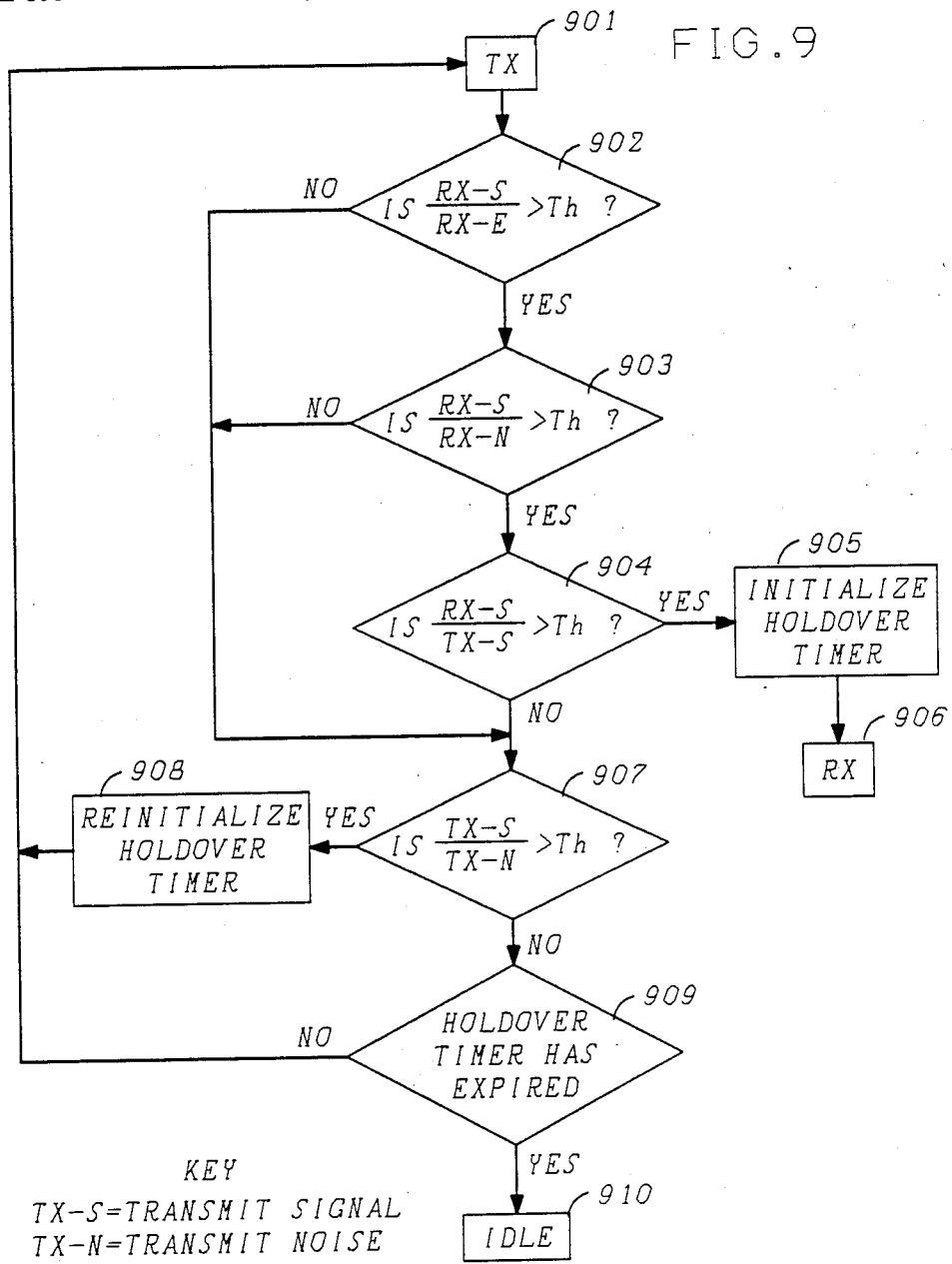
FIG. 9 depicts a flow chart illustrating the operation of the speakerphone of FIG. 1 in determining whether to remain in the transmit state or move from the transmit state to the receive state or idle state.
Figure 10:
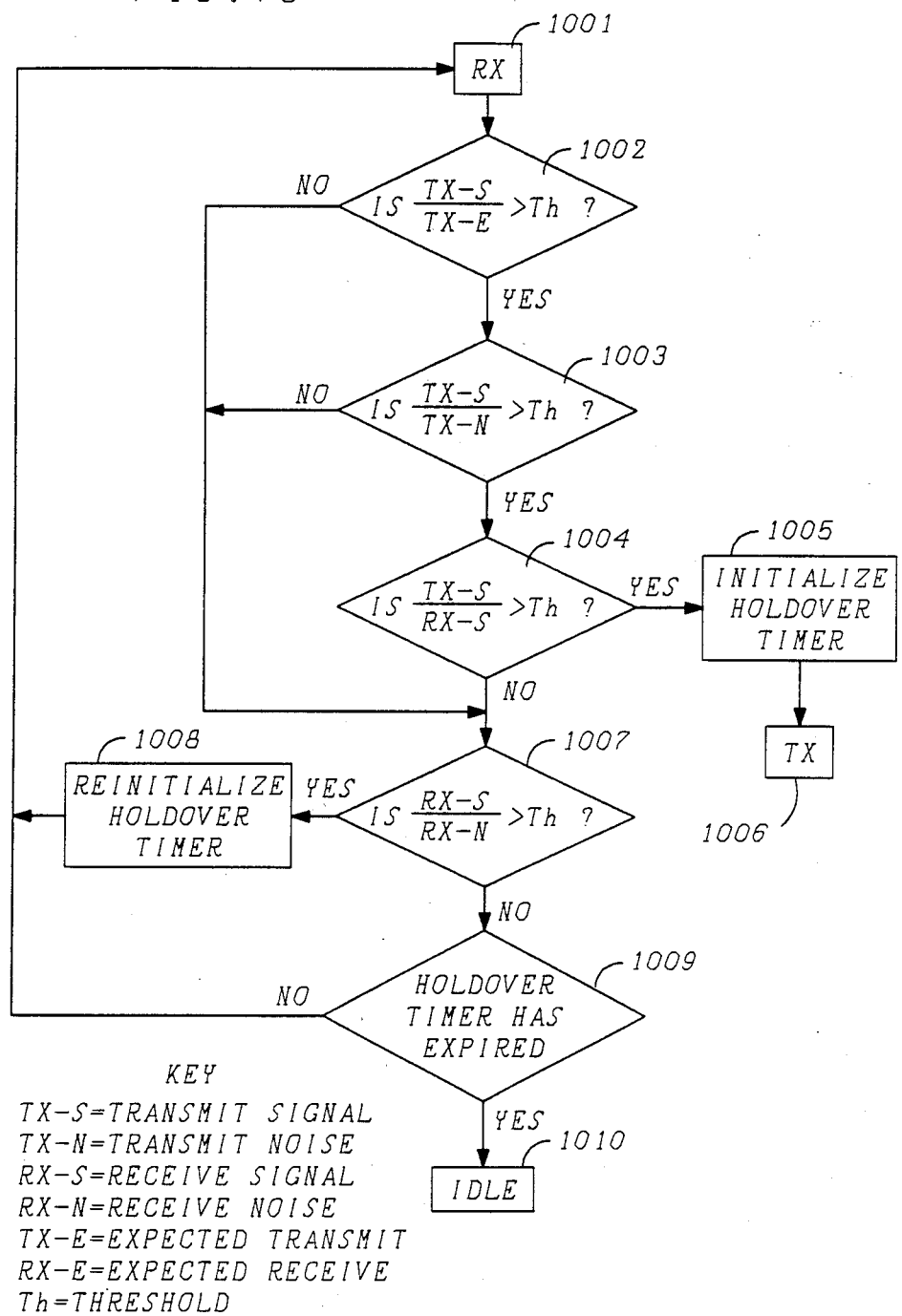
FIG. 10 depicts a flow chart illustrating the operation of the speakerphone of FIG. 1 in determining whether to remain in the receive state or move from the receive state to the transmit state or idle state.

In accordance with the invention, the computer controlled adaptive speakerphone 100 of FIG. 1 advantageously employs a process or program described herein with reference to a state diagram of FIG. 7 and flow diagrams of FIGS. 8, 9 and 10 for improved performance. This process dynamically adjusts the operational parameters of the speakerphone for the best possible performance in view of existing hybrid and acoustic coupling conditions.

Referring now to FIG. 7, there is shown the state diagram depicting the possible states of the speakerphone 100. The speakerphone initializes in an idle state 701. While in this state, the speakerphone has a symmetrical path for entering into either a transmit state 702 or a receive state 703, according to which of these two has the stronger signal. If there is no transmit or receive speech while the speakerphone is in the idle state 701, the speakerphone remains in this state as indicated by a loop out of and back into this idle state. Generally, if speech is detected in the transmit or receive path, the speakerphone moves to the corresponding transmit or receive state. If the speakerphone has moved to the transmit state 702, for example, and transmit speech continues to be detected, the speakerphone then remains in this state. If the speakerphone detects receive speech having a stronger signal than the transmit speech, a receive break-in occurs and the speakerphone moves to the receive state 703. If transmit speech ceases and no receive speech is present, the speakerphone returns to the idle state 701. Operation of the speakerphone in the receive state 703 is essentially the reverse of its operation in the transmit state 702. Thus if there is receive speech following the speakerphone moving to the receive state 703, the speakerphone stays in this state. If transmit speech successfully interrupts, however, the speakerphone goes into the transmit state 702. And if there is no receive speech while the speakerphone is in the receive state 703 and no transmit speech to interrupt, the speakerphone returns to the idle state.

Referring next to FIG. 8, there is shown a flow chart illustrating in greater detail the operation of the speakerphone 100 in determining whether to remain in the idle state or move from the idle state to the transmit state or receive state. The process is entered at step 801 wherein the speakerphone is in the idle state. From this step, the process advances to the decision 802 where it determines whether the dectected transmit signal is greater than the transmit noise by a certain threshold. If the detected transmit signal is greater than the transmit noise by the desired amount, the process proceeds to decision 803. At this decision, a determination is made as to whether the detected transmit signal exceeds the expected transmit signal by a certain threshold.

The expected transmit signal is that component of the transmit signal that is due to the receive signal coupling from the loudspeaker to the microphone. This signal will vary based on the receive speech signal, the amount of switched loss, and the acoustics of the room as determined during the acoustic calibration process. The expected transmit level is used to guard against false switching that can result from room echoes; therefore, the transmit level must exceed the expected transmit level by a certain thershold in order for the speakerphone to switch into the transmit state.

If the detected transmit signal does not exceed the expected transmit signal by the threshold, the process advances to decision 806. If the detected transmit signal exceeds the expected transmit signal by the threshold, however, the process advances to step 804 where a holdover timer is initialized prior to the speakerphone entering the transmit state. Once activated, this timer keeps the speakerphone in either the transmit state or the receive state over a period of time, approximately 1.2 seconds, when there is no speech in the then selected state. This allows a suitable period for bridging the gap between syllables, words and phrases that occur in normal speech. From step 804 the process advances to step 805 where the speakerphone enters the transmit state.

Referring once again to step 802, if the detected transmit signal is not greater than the transmit noise by a certain threshold, then the process advances to the decision 806. In this decision, and also in decision 807, the receive path is examined in the same manner as the transmit path in decisions 802 and 803. In decision 806, the detected received signal is examined to determine if it is greater than the receive noise by a certain threshold. If the detected receive signal is not greater than the receive noise by this threshold, the process returns to the step 801 and the speakerphone remains in the idle state. If the detected receive signal is greater than the receive noise by the desired amount, the process proceeds to decision 807. At this decision, a determination is made as to whether the detected receive signal exceeds the expected receive signal by a certain threshold.

The expected receive signal represents the amount of speech seen on the receive line that is due to transmit speech coupled through the hybrid. This signal is calculated on an ongoing basis by the speakerphone and depends on the hybrid average, the amount of switched loss, and the transmit speech signal. Since the transmit speech path is open to some extent while the speakerphone is in the idle state, this causes a certain amount of hybrid reflection to occur, which, in turn, causes a certain amount of the speech signal detected on the receive path to be due to actual background noise or speech in the room. This, in turn, is read as a certain expected level of receive speech. And the actual receive speech signal must surpass this expected level by the threshold in order for the speakerphone to determine with certainty that there is actually a fat-end party talking.

If the detected receive signal does not exceed the expected receive signal by the threshold, the process returns to the step 801 and the speakerphone remains in the idle state. If the detected receive signal exceeds the expected receive signal by the threshold, however, the process advances to step 808 where the holdover timer is initialized. From step 808 the process advances to step 809 where the speakerphone is directed to enter the receive state.

Referring next to FIG. 9, there is shown a flow chart illustrating in greater detail the operation of the speakerphone 100 in determining whether to remain in the transmit state or move from the transmit state to either the receive state or idle state. The process is entered at step 901 wherein the speakerphone has entered the transmit state. From this step, the process advances to the decision 902 where a determination is made as to whether the detected receive signal exceeds the expected receive signal by a certain threshold. If the detected receive signal does not exceed the expected receive signal by the threshold, the process advances to decision 907. If the detected receive signal exceeds the expected receive signal by the threshold, however, the process advances to step 903 where the the detected received signal is examined to determine if it is greater than the receive noise by a certain threshold. If the detected receive signal is not greater than the receive noise by this threshold, the process advances to decision 907. If the detected receive signal is greater than the receive noise by the desired amount, the process proceeds to decision 904.

At decision 904, a determination is made as to whether the detected receive signal is greater than the detected transmit signal by a certain threshold. This decision is applicable when the near-end party and the far-end party are both speaking and the far-end party is attempting to break-in and change the state of the speakerphone. If the detected receive signal is not greater than the detected transmit signal by the threshold, the process proceeds to decision 907. If the detected receive signal is greater than the detected transmit signal by the threshold, however, the process proceeds to step 905 where the holdover timer is initialized for the receive state. From step 905, the process advances to step 906 where it causes the speakerphone to enter the receive state.

At decision 907, the process checks to see if the detected transmit signal is greater than the transmit noise by a certain threshold. If the detected transmit signal is greater than the transmit noise by the desired amount, the holdover timer is reinitialized at step 908, the process returns to step 901 and the speakerphone remains in the transmit state. Each time the holdover timer is reinitialized for a certain state, the speakerphone will remain minimially in that state for the period of the holdover timer, 1.2 seconds.

If at decision 907, the process finds that the detected transmit signal is less than the transmit noise by a certain threshold, i.e., no speech from the near-end party, the process advances to the decision 909 where it determines if the holdover timer has expired. If the holdover timer has not expired, the process returns to step 901 and the speakerphone remains in the transmit state. If the holdover timer has expired, the process advances to step 910 and the speakerphone returns to the idle state.

Referring next to FIG. 10, there is shown a flow chart illustrating in greater detail the operation of the speakerphone 100 in determining whether to remain in the receive state or move from the receive state to either the transmit state or idle state. The process is entered at step 1001 wherein the speakerphone has entered the receive state. From this step, the process advances to the decision 1002 where a determination is made as to whether the detected transmit signal exceeds the expected transmit signal by a certain threshold. If the detected transmit signal does not exceed the expected transmit signal by the threshold, the process advances to decision 1007. If the detected transmit signal exceeds the expected transmit signal by the threshold, however, the process proceeds to step 1003 where the the detected transmit signal is examined to determine if it is greater than the transmit noise by a certain threshold. If the detected transmit signal is not greater than the transmit noise by this threshold, the process advances to decision 1007. If the detected transmit signal is greater than the transmit noise by the desired amount, the process proceeds to decision 1004.

At decision 1004, a determination is made as to whether the detected transmit signal is greater than the detected receive signal by a certain threshold. This decision is applicable when the far-end party and the near-end party are both speaking and the near-end party is attempting to break-in and change the state of the speakerphone. If the detected transmit signal is not greater than the detected receive signal by the threshold, the process proceeds to decision 1007. If the detected transmit signal is greater than the detected receive signal by the threshold, however, the process proceeds to step 1005 where the holdover timer is initialized for the transmit state. From step 1005, the process advances to step 1006 where it causes the speakerphone to enter the transmit state.

At decision 1007, the process checks to see if the detected receive signal is greater than the recieve noise by a certain threshold. If the detected receive signal is greater than the receive noise by the desired amount, the holdover timer is reinitialized at step 1008, the process returns to step 1001 and the speakerphone remains in the receive state.

If at decision 1007, the process finds that the detected receive signal is less than the receive noise by a certain threshold, i.e., no speech from the far-end party, the process advances to the decision 1009 where it determines if the holdover timer has expired. If the holdover timer has not expired, the process returns to step 1001 and the speakerphone remains in the receive state. If the holdover timer has expired, the process advances to step 1010 and the speakerphone returns to the idle state.

Figure 11:
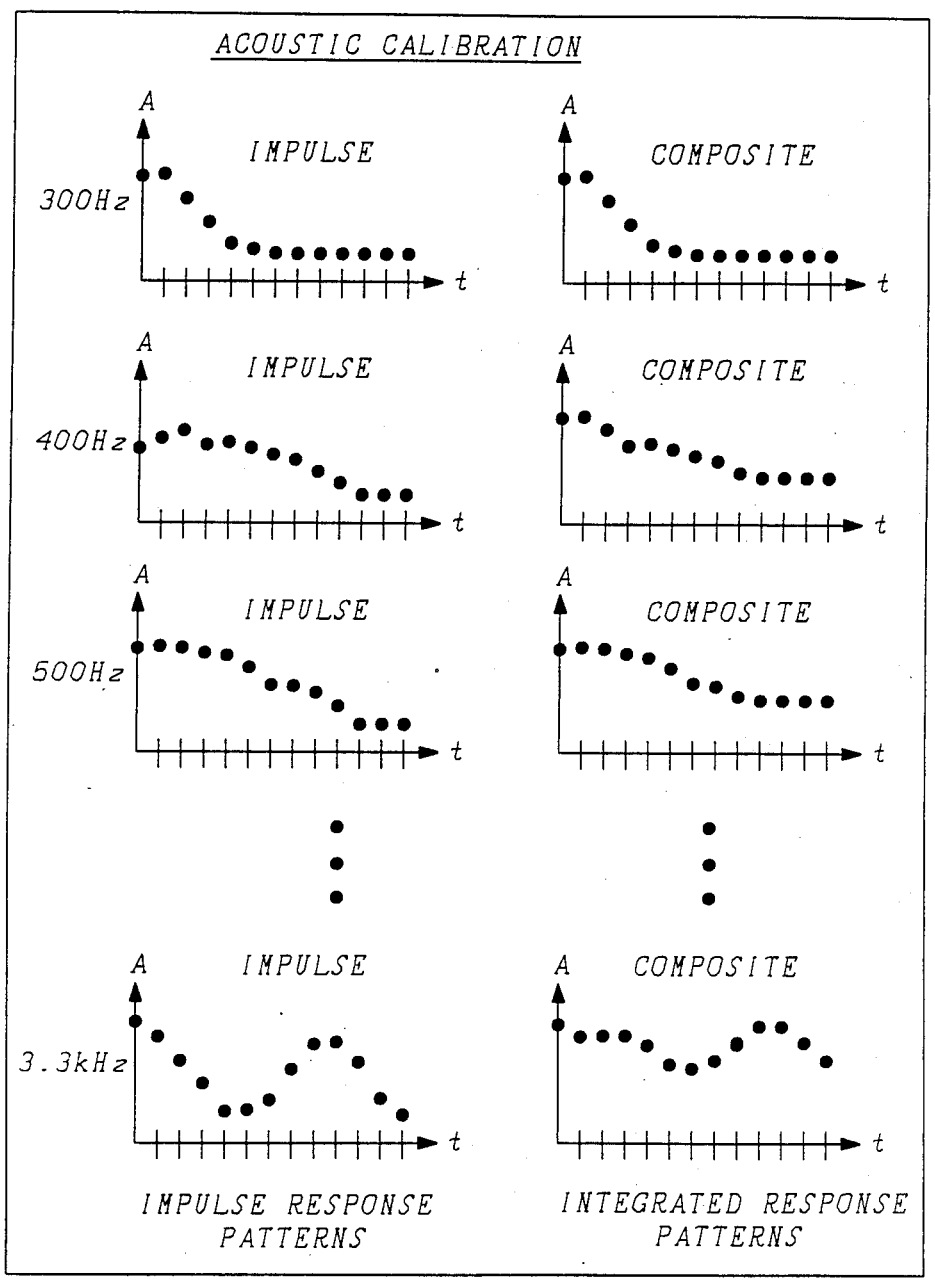
FIG. 11 are illustrative waveforms which depict impulse and composite characterizations of an acoustic environment performed by the speakerphone of FIG. 1.

Referring now to FIG. 11, there is shown illustrative waveforms which provide an impulse and a composite characterization of an acoustic environment obtained during the acoustic calibration process performed by the speakerphone 100. A tone signal, generated between 300 Hz and 3.3 KHz in fifty equal logarithmically spaced frequency steps, is applied to the loudspeaker 112 of the speakerphone and the return echo for each tone measured by the microphone 111 and analyzed by the computer 110. Samples of the return echo for each tone signal generated are taken at 10 millisecond intervals for a total sampling period of 120 milliseconds.

The sample impulse responses shown in FIG. 11 are for the four frequencies, 300 Hz, 400 Hz, 500 Hz and 3.3 KHz. As illustrated in this figure, the 300 Hz response initially has a fairly high amplitude (A), but the energy quickly dissipates after the tone stops. In the 400 Hz response, its amplitude (A) is intially lower, however, the energy does not dissipate as rapidly as in the 300 Hz response. And the energy in the 500 Hz response dissipates even slower than the 300 Hz and the 400 Hz impulse responses.

A composite waveform is generated next to each 300 Hz, 400 Hz and 500 Hz impulse response. This composite waveform represents an integrated response pattern of the impulse response. The 300 Hz impulse response and the 300 Hz composite response are identical since this is the first measured response. The subsequent composite responses are modified based on the new information that comes in with each new impulse response. If that new information shows any ten millisecond time interval with a higher amplitude return than is then on the composite response for the corresponding time interval, the old information is replaced by the new information. If the new information has a lower amplitude return than that on the composite for that corresponding time interval, the old information is retained on the composite response. The 3.3 KHz frequency tone is the last of the 50 tones to be generated. The composite response after this tone represents, for each ten millisecond time interval, essentially the worst case acoustic coupling that may be encountered by the speakerphone during operation, independent of frequency.

This measure of the initial characterization of the room acoustic environment in which the speakerphone operates is used in a number of ways. The composite response is used for setting a switchguard threshold which insures that receive speech, if coming out of the loudspeaker is not fasely detected as transmit speech and returned to the far-end party.

The composite response is also used for determining the total amount of loop loss necessary for proper operation of the speakerphone. The amount of receive speech signal that is returned through the microphone from the loudspeaker is used as part of the equation which also includes the amount of hybrid return, the amount of loss inserted by the programmable attenuators and the gain setting of the volume control to determine the total amount of loop loss.

The composite response is further used in determining the expected transmit level. This expected transmit level is obtained from a convolution of the composite impulse response with the receive speech samples. The receive speech samples are available in real time for the immediately preceding 120 milliseconds with sample points at approximately 10 millisecond intervals. The value of the sample points occurring at each 10 millisecond interval in the receive response are convolved with the value of the sample points corresponding to the same 10 millisecond intervals in the composite response. In this convolution, the sampled values of the received speech response are, on a sample point by sample point basis, multiplied by the corresponding values of the sample points contained in the composite response. The resulting products are then summed together to obtain a single numerical value which represents the convolution of the immediately preceding 120 milliseconds of receive speech and 120 milliseconds of initial room characterization. This numerical value represents the amount of receive speech energy that is still in the room and will be detected by the microphone.

The following example illustrates how the convolution of the composite response with the received speech provides for more efficient operation of the speakerphone. If, by way of example, the near-end party begins talking and the speakerphone is in the receive state receiving speech from the far-end party, a certain amount of the signal coming out of the loudspeaker is coupled back into the microphone. The speakerphone has to determine whether the speech seen at the microphone is due solely to acoustic coupling, or whether it is due to the near-end talker. This determination is essential in deciding which state the speakerphone should be entering. To make this determination, the computer convolves the composite impulse response of the room with the receive speech signal to determine the level of speech seen at the microphone that is due to acoustic coupling. If the amount of signal at the microphone is greater than expected, then the computer knows that the near-end user is trying to interrupt and can permit a break-in; otherwise, the speakerphone will remain in the receive state.

When a speakerphone type device is operated in a near full or full duplex mode, the far-end party's speech emanating from the loudspeaker is coupled back into the microphone and back through the telephone line to far-end. Because of the proximity of the loudspeaker to the microphone, the speech level at the microphone resulting from speech at the loudspeaker is typically much greater than that produced by the near-end party. The result is a loud and reverberant return echo to the far-end. To alleviate this unpleasant side effect of near full or full duplex operation, an echo suppression process, which inserts loss in the transmit path as appropriate, is employed.

Figure 12:
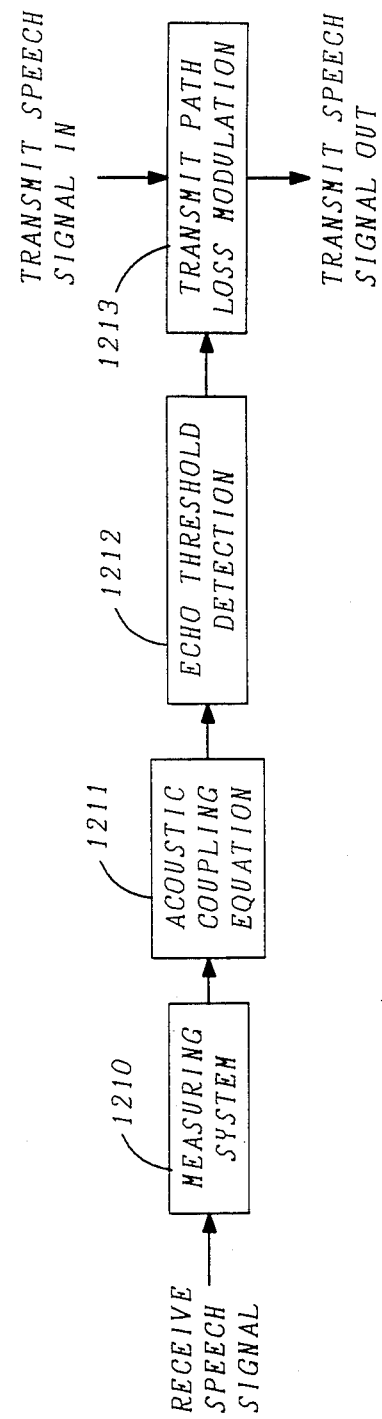
FIG. 12 is a block representation of the functional components of a speakerphone operable in providing echo suppression loss insertion.

A diagram generally illustrating the insertion of echo suppression loss during near full or full duplex operation is shown in FIG. 12. The speech signal in the receive path is measured by a measuring system 1210. Such a measuring system, by way of example, is available from high pass filter 312, envelope detector 314 and logarithmic amplifier 316 shown in FIG. 1. The output of measuring system 1210 is passed through an acoustic coupling equation 1211 in order to include the effects of acoustic coupling on the signal to be seen at the microphone. The acoustic coupling equation could be as simple as a fast attack, slow decay analog circuit. In this implementation, the acoustic coupling equation is the composite room impulse response that is generated during the acoustic calibration phase of the calibration process. The output of the equation is the expected transmit signal level described earlier herein. The resulting signal is then used to provide control signal for the modulation of the transmit path loss. An echo threshold detection circuit 1212 monitors the amplitude of the control signal from the acoustic coupling equation 1211. When the control signal exceeds a predetermined threshold (below which the return echo would not be objectionable to the far-end party) transmit loss which tracks the receive speech is inserted into the transmit path by the modulation circuit 1213.

By monitoring the transmit and receive speech signals, the process determines when the speech signal into the microphone is a result of acoustically coupled speech from the loudspeaker. While the speakerphone is operating, the expected transmit signal level is also constantly monitored. This level is a direct indication of loudspeaker to microphone coupling and loop switched loss. This expected transmit level will tend to get larger as the speakerphone approaches full duplex operation. When this signal exceeds an echo threshold (below which the return echo would not be objectionable to the far-end party), additional loss is inserted into the transmit path. This echo suppression loss, when needed, tracks the receive speech envelope at a syllabic rate after a 1 to 5 millisecond delay.

Figure 13:
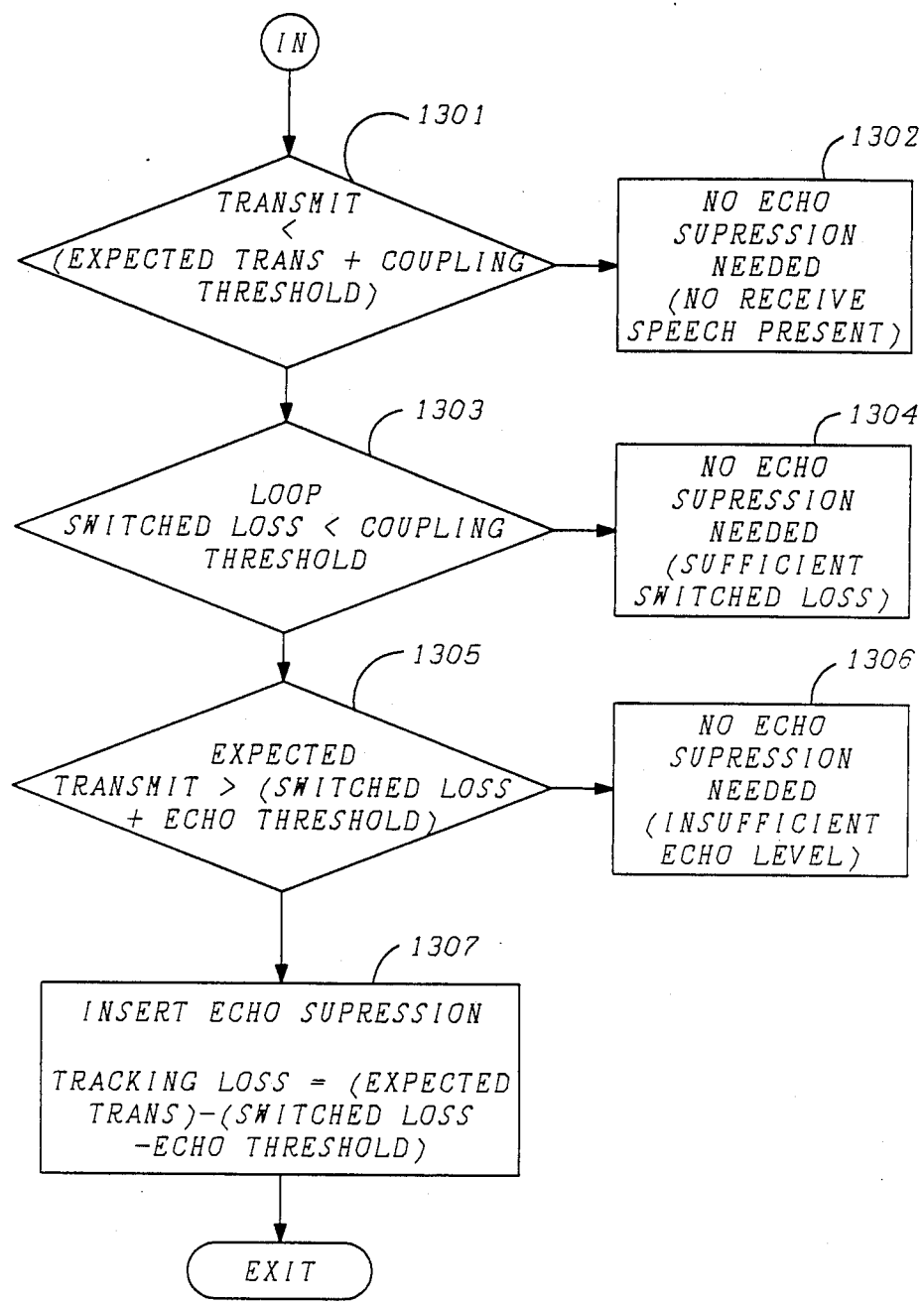
FIG. 13 depicts a flow chart illustrating the operation of the speakerphone of FIG. 12 in the application of echo suppression loss insertion.

Referring next to FIG. 13, there is shown a flow diagram illustrating the decision making process for the application of echo suppression loss. The process is entered at decision 1301 where the transmit signal level is compared with the expected transmit signal level plus a coupling threshold. If the expected transmit signal level plus the coupling threshold is less than the measured transmit signal, the process advances to step 1302 since receive speech is not present and echo suppression is therefore not necessary. If the expected transmit signal level plus the coupling threshold is greater than the measured transmit signal, the process advances to decision 1303 since the speakerphone is emanating speech from the loudspeaker that may need to be suppressed.

At decision 1303, a determination is made as to whether the loop switched loss is great enough to obviate the need for additional echo suppression loss. If loop switched loss is greater than the coupling threshold, the process advances to step 1304 since the switched loss will prevent objectionable echo to the far-end and echo suppression is not necessary. If loop switched loss is not great enough to provide sufficient echo reduction, however, the process advances to decision 1305.

At decision 1305, a determination is made as to whether the expected level of the transmit signal is greater than the loop switched loss plus an echo threshold. If so, the process advances to step 1306 since the return echo would not be objectionable to the far-end party and echo suppression is not necessary. If, however, the expected level of the transmit signal is less than the loop switched loss plus an echo threshold, echo suppression is necessary and the process advances to step 1307. The echo suppression is then inserted into the transmit path at step 1307 as follows: loss=expected transmit level-(loop switched loss-echo threshold).

Figure 14:
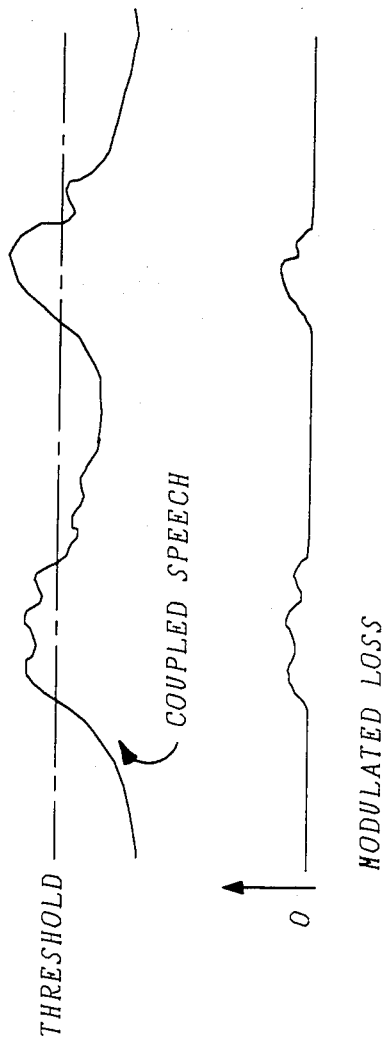
FIG. 14 are waveforms illustrating the application of echo suppression loss insertion.

Shown in FIG. 14 is a waveform illustrating how, in speakerphone 100, loss is inserted into the transmit path via programmable attenuator 213 in accordance with the echo suppression process.

Although a specific embodiment of the invention has been shown and described, it will be understood that it is but illustrative and that various modifications may be made therein without departing from the spirit and scope of the invention as defined in the appended claims.

What is claimed is:

1. In a voice switching apparatus for processing speech signals on a communication line, the apparatus including means for switching between a receive state for receiving speech signals from the communication line and a transmit state for transmitting speech signals over the communication line, an electrical calibration circuit for determining the operational readiness of speech processing circuitry in the apparatus and comprising:
    means for generating a tone signal;
    means for coupling this tone signal in a loop configuration through the speech processing circuitry;
    means for detecting the return of the tone signal;
    means responsive to the return of the tone signal for measuring the form of said returned tone signal; and
    calibration means operably responsive to the measuring means for adjusting threshold switching levels at which the apparatus switches between the receive state and the transmit state.

2. The electrical calibration circuit as in claim 1 wherein the tone signal is generated by the tone generating means at a first amplitude and at a second reduced amplitude for coupling in the loop configuration through the speech processing circuitry.

3. The electrical calibration circuit as in claim 2 wherein the measuring means includes comparison means for comparing the amplitude levels of the returned tone signal, the difference between the two levels providing a basic constant of proportionality reflective of the speech coupling efficiency of the speech processing circuitry, and the comparison means providing the basic constant of proportionality to the calibration means.

4. The electrical calibration circuit as in claim 3 wherein the speech processing circuitry comprises a transmit section for processing the speech signals for transmission over the communication line and a receive section for processing the speech signals received from the communication line, the tone signal being separately coupled through both the transmit section and the receive section for determining the basic constant of proportionality for each section.

5. A method of determining the operational readiness of speech processing circuitry in a voice signal controller connectable to a communication line, the voice signal controller switching between a receive state for receiving speech signals from the communication line and a transmit state for transmitting speech signals over the communication line, the method comprising the steps of:
    generating a tone signal;
    coupling this tone signal in a loop configuration through the speech processing circuitry;
    detecting the return of the tone signal;
    measuring the form of said returned tone signal; and
    adjusting threshold switching levels at which the controller switches between the receive state for receiving speech signals and the transmit state for transmitting speech signals responsive to the measuring step.

6. A method of determining the operational readiness of speech processing circuitry as in claim 5 wherein the tone generating step includes generating the tone signal at a first amplitude and at a second reduced amplitude for coupling in the loop configuration through the speech processing circuitry.

7. A method of determining the operational readiness of speech processing circuitry as in claim 6 wherein the measuring step further includes the step of comparing the amplitude levels of the returned tone signal, the difference between the two levels providing a basic constant of proportionality reflective of the speech coupling efficiency of the speech processing circuitry, and the threshold switching levels adjusting step responsive to the comparison step adjusting the threshold switching levels in accordance with the basic constant of proportionality.

8. A method of determining the operational readiness of speech processing circuitry as in claim 7 wherein the speech processing circuitry comprises a transmit section for processing the speech signals for transmission over the communication line and a receive section for processing the speech signals received from the communication line, the tone signal being separately coupled by the coupling step through both the transmit section and the receive section for determining the basic constant of proportionality for each section.

* * * * *